US008411995B2

(12) United States Patent
Drouin et al.

(10) Patent No.: US 8,411,995 B2
(45) Date of Patent: Apr. 2, 2013

(54) DECONVOLUTION-BASED STRUCTURED LIGHT SYSTEM WITH GEOMETRICALLY PLAUSIBLE REGULARIZATION

(75) Inventors: Marc-Antoine Drouin, Montreal (CA); Guy Godin, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 904 days.

(21) Appl. No.: 12/453,765

(22) Filed: May 21, 2009

(65) Prior Publication Data

US 2010/0034429 A1 Feb. 11, 2010

Related U.S. Application Data

(60) Provisional application No. 61/071,915, filed on May 23, 2008.

(51) Int. Cl.
*G06K 9/64* (2006.01)
(52) U.S. Cl. ........ 382/279; 318/577; 345/419; 356/603; 356/623; 382/154; 382/291
(58) Field of Classification Search .................. None
See application file for complete search history.

(56) References Cited

U.S. PATENT DOCUMENTS

| | | | | | |
|---|---|---|---|---|---|
| 4,687,325 | A | * | 8/1987 | Corby, Jr. ...................... | 356/3.09 |
| 5,083,073 | A | * | 1/1992 | Kato ............................. | 318/577 |
| 5,461,478 | A | * | 10/1995 | Sakakibara et al. ........... | 356/623 |
| 5,499,306 | A | * | 3/1996 | Sasaki et al. .................. | 382/291 |
| 6,529,627 | B1 | * | 3/2003 | Callari et al. .................. | 382/154 |
| 6,549,288 | B1 | * | 4/2003 | Migdal et al. ................. | 356/603 |
| 7,957,583 | B2 | * | 6/2011 | Boca et al. ..................... | 382/154 |
| 2006/0017720 | A1 | * | 1/2006 | Li .................................. | 345/419 |
| 2009/0102840 | A1 | * | 4/2009 | Li .................................. | 345/419 |
| 2009/0244300 | A1 | * | 10/2009 | Levin et al. ................... | 348/208.5 |
| 2010/0246890 | A1 | * | 9/2010 | Ofek et al. ..................... | 382/105 |
| 2011/0080471 | A1 | * | 4/2011 | Song et al. ..................... | 348/46 |
| 2011/0181704 | A1 | * | 7/2011 | Gordon et al. ................. | 348/49 |

FOREIGN PATENT DOCUMENTS

EP   2 085 927 A1 *   1/2008

OTHER PUBLICATIONS

Le et al "Automatic Reclibration of an active structured light visision system" IEEE vol. 19, No. 2, Apr. 2003.*
Baker et al., "Accuracy limitations introduced by digital projection sources in profilometric optical metrology systems", Conf. on Optoelectronic and Microelectronic Materials and Devices, p. 261-264, 2004.
Bar et al., "Variational pairing of image segmentation and blind restoration", Europ. Conf. on Comput. Vision, p. 166-177, 2004.

(Continued)

*Primary Examiner* — Tsung-Yin Tsai
(74) *Attorney, Agent, or Firm* — Brion Raffoul (57) ABSTRACT

Systems and methods for processing images in a structured light system which may be used to determine the correspondences in a camera-projector system. Those correspondences can later be used to construct a 3D model, to calibrate a projector or for other purposes. The optical and geometric characteristics of the system are initially determined. The capability of establishing correspondences is affected by the limitations of the system and the properties of the surfaces. Once images of the patterns projected on the surface are acquired, they are iteratively segmented and deconvolved using the known characteristics of the system. The result is a set of correspondences with a reduction of artifacts introduced by the limitations of the system. The characteristics of the structured light system which may be used in the iterative segmentation and deconvolution may include the characteristics of a pattern projected on the scene or object, the physical characteristics of the structured light system, as well as the characteristics of the scene or object itself.

13 Claims, 8 Drawing Sheets

OTHER PUBLICATIONS

Boden et al., "Massively parallel spatially-variant maximum likelihood restoration of Hubble space telescope imagery", J. Opt. Soc. Am. A, 13:1537-1545, 1996.
Brunton et al., "Belief propagation on the GPU for stereo vision", Canad. Conf. on Comput. and Robot Vision, 2006.
Chen et al, "Range acquisition using color structured lighting and stereo vision", Image Vision Comput., 15:445-456, 1997.
Esedoglu S., "Blind deconvolution of bar code signals", Inverse Problems, 20:121-135, 2004.
Faisal et al, "Implementation of a modified Richardson-Lucy method for image restoration on a massively parallel computer to compensate for space-variant point spread function of a charge-coupled device camera", J. Opt. Soc. Am. A, vol. 12(12), p. 2593-2603, 1995.
Gong et al., "Fast stereo matching using reliability-based dynamic programming and consistency constraint", Int. Conf. on Comput. Vision, 2003.
Hansen P.C., "Deconvolution and regularization with Toeplitz matrices", Numerical Algorithms, 29:323-378, 2002.
Hartley et al., Chapter 9 "Epipolar geometry and the fundamental matrix", Multiple View Geometry in Computer Vision, Cambridge University Press, 2nd edition, p. 239-261, 2004.
Hartley et al, Chapter 12 "Structure computation", Multiple View Geometry in Computer Vision, Cambridge University Press, 2nd edition, p. 310-324, 2004.
Inokuchi et al., "Range Imaging System for 3-D Object Recognition", Proceedings of the 7th International Conference on Pattern Recognition, p. 806-808, 1984.
Kamm et al., "Kroencker Product and SVD Approximations in Image Restoration", Linear Algebra and its Applications, 284:177-192, 1998.
Koninckx et al., "A Graph Cut Based Adaptive Structured Light Approach for Real-Time Range Acquisition", Proceedings of the 2nd International Symposium on 3D Data Processing, Visualization and Transmission, 2004.
Koninckx et al, "Scene-Adapted Structured Light", IEEE Conf. on Computer Vision and Pattern Recognition, p. 611-618, 2005.
Lauer T., "Deconvolution with a spatially-variant PSF", Astronomical Data Analysis II, vol. 4847, p. 167-173, 2002.
Li S., "Introduction", Markov Random Field Modeling in Computer Vision, chapter 1, Springer-Verlag, 1995.
Li S., "Low Level MRF Models", Markov Random Field Modeling in Computer Vision, chapter 2, Springer-Verlag, 1995.
Li Y.F. et al., "Authomatic Recalibration of an Active Structured Light Vision System", IEEE J. Robotics and Automation, 19(2), p. 259-268, 2003.
Liu et al., "GPU Accelerated Smith-Waterman", International Conference on Computer Science, p. 188-195, 2006.
Lucchese et al., "Color Image Segmentation: A State-of-the-art Survey", Image Processing, Vision and Pattern Recognition, vol. 67(2), 2001.
McNown et al., "Approximate Shift-Invariance by Warping Shift-Variant Systems", The Restoration of HST Images and Spectra II, p. 181-187, 1994.
Mignotte M., "A Segmentation-Based Regularization Term for Image Deconvolution", IEEE Transactions on Image Processing, vol. 15(7), p. 1973-1984, 2006.
Nagy et al., "Restoring Images Degraded by Spatially Variant Blur", SIAM Journal on Scientific Computing, vol. 19(4), p. 1063-1082, 1998.
Salvi et al., "Pattern Codification Strategies in Structured Light Systems", Pattern Recognition, vol. 37(4), p. 827-849, 2004.
Sawchuk A.A., "Space-Variant Image Restoration by Coordinate Transformations", Journal of the Optical Society of America, vol. 64(2), p. 138-144, 1974.
Sezgin et al., "Survey over Image Thresholding Techniques and Quantitative Performance Evaluation", Journal of Electronic Imaging, vol. 13(1), p. 146-165, 2004.
Tardif et al., "A MRF Formulation for Coded Structured Light", Proceedings of the 5th International Conference on 3-D Digital Imaging and Modeling, 2005.
Trussell et al., "Image Restoration of Space-Variant Blurs by Sectional Methods", IEEE Transactions on Acoustics, Speech, and Signal Processing, vol. 26(6), p. 608-609, 1978.
Yedidia et al., "Understanding Belief Propagation and Its Generalizations", Exploring Artificial Intelligence in the New Millennium, Chap. 8, p. 239-236, 2003.
Zhang et al., "Rapid Shape Acquisition Using Color Structured Light and Multi-Pass Dynamic Programming", Proceedings of the 1st International Symposium on 3D Data Processing Visualization and Transmission, p. 1-13, 2002.

* cited by examiner

DECONVOLUTION-BASED STRUCTURED LIGHT SYSTEM WITH GEOMETRICALLY PLAUSIBLE REGULARIZATION

CROSS-REFERENCE TO RELATED APPLICATION

The present application claims priority on U.S. Provisional Patent Application Ser. No. 61/071,915 filed May 23, 2008.

FIELD OF THE INVENTION

The present invention relates to image processing. More specifically, the present invention relates to methods and systems for processing images which are used to establish correspondences in a camera-projector system.

BACKGROUND TO THE INVENTION

It should be noted that a list of the references referred to in this document may be found at the end of the document.

In the past few years, projector-camera systems have been used in many applications ranging from 3D reconstruction to multi-projector visualization. For many applications, the main task is to establish the correspondence between the pixels of a projector and those of a camera (see FIG. 1). This is accomplished by projecting known light patterns on an unknown scene viewed by a camera. The projector "applies" textures to the scene and the patterns are designed (or structured) such that it is possible to identify which projector pixel illuminates the part of the scene viewed by a camera pixel. Different patterns can be used: a survey by Salvi et al. classified these patterns in 3 categories, namely, direct codification, neighborhood codification and time-multiplexing. The Gray code is probably the best known time-multiplexing code [14]. It uses a succession of patterns composed of white and black stripes. For this reason, it is also known as a stripe-based code. The width of the stripes vary with the patterns.

When working with a structured light system, many sources of error can affect image formation. These sources of error can be classified as originating from projection, imaging or from the overall system:

Projection Depth of field and chromatic aberration affect the detectability of spatial transitions. Calibration parameters vary due to thermal instability. Error is introduced by dithering and signal synchronization.

Imaging Depth of field, anti-aliasing filter and small fill factor limit the detectability of the pattern. Also, when using color cameras, artifacts are introduced by Bayer color processing and the Bayer matrix itself.

Overall system Surface properties and ambient light impact the Signal-to-Noise Ratio (SNR). It is also reduced by high frame rates, or non-uniform sensitivity of the projection and of the camera.

Previous work in this field has attempted to overcome these errors. A recent paper by Salvi et al. [26] contains an extensive survey of structured light (SL) techniques. Few methods use energy minimization frameworks for the decoding of patterns [5, 32, 16, 29, 17]. Some use these energy minimization frameworks to remove ambiguity in their code [5, 32, 16], while others use it to reduce sensitivity to noise [29, 17]. In [20], the best focus distance is used as a constraint in the self-calibration of a SL system.

It should be noted that, however, there is a large body of literature on the problem of thresholding, segmentation and deconvolution [28, 22]. Some methods simultaneously segment and deconvolve the images [24, 2]. However these methods do not address or take advantage of the aspects that are specific to a structured light system.

So far, no reference has been found which explicitly models blurring.

It is therefore an object of the present invention to mitigate if not overcome the shortcomings of the prior art.

SUMMARY OF THE INVENTION

The present invention provides systems and methods for processing images in a structured light system in order to determine the correspondences in a camera-projector system. Those correspondences can later be used to construct a 3D model, to calibrate a projector or for other purposes. The optical and geometric characteristics of the system are initially determined. The capability of establishing correspondences is affected by the limitations of the system and the properties of the surfaces. Once images of the patterns projected on the surface are acquired, they are iteratively segmented and deconvolved using the known characteristics of the system. The result is a set of correspondences with a reduction of artifacts introduced by the limitations of the system. The characteristics of the structured light system which may be used in the iterative segmentation and deconvolution may include the characteristics of a pattern projected on the scene or object, the physical characteristics of the structured light system, as well as the characteristics of the scene or object itself.

In one aspect, the present invention provides a method for processing images from a structured light system for use with data processing systems, the method comprising:

obtaining at least one initial image from a structured light system, the or each of said at least one initial image being of a subject having projected on it at least one pattern by said structured light system;

determining characteristics of said structured light system;

iteratively segmenting and deconvolving said at least one initial image using said characteristics of said structured light system and at least one point spread function to result in at least resulting image, said resulting image being a more accurate image of said subject compared to said at least one image.

In another aspect, the present invention provides a method for processing images from a structured light system for use with data processing systems, the method comprising:

obtaining at least one initial image from a structured light system;

determining characteristics of said structured light system;

iteratively segmenting and deconvolving said at least one initial image using said characteristics of said structured light system to result in at least one non-blurred resulting image compared to said at least one image.

In a further aspect, the present invention provides a computer readable storage medium having stored thereon at least one computer executable command for execution by a data processing system which, when executed by said data processing system, results in performance of the steps of a method for processing images from a structured light system for use with data processing systems, the method comprising:

obtaining at least one initial image from a structured light system, the or each of said at least one initial image being of a subject having projected on it at least one pattern by said structured light system;

determining characteristics of said structured light system;

iteratively segmenting and deconvolving said at least one initial image using said characteristics of said structured light system and at least one point spread function to result in at least resulting image, said resulting image being a more accurate image of said subject compared to said at least one image.

BRIEF DESCRIPTION OF THE DRAWINGS

These and other features of the invention will become more apparent from the following description in which reference is made to the appended drawings in which.

DETAILED DESCRIPTION OF THE INVENTION

The present invention relates to structured light systems. As is well known and as can be seen from FIG. 1, a structured light system involves one or more cameras, one or more projectors, and the scene or object to be imaged. Each projector projects a pattern on the scene or object and each camera captures an image of the scene or object with the pattern projected on it. As was described above, the main task is to establish the correspondence between the pixels of the projector and those of the camera so that it can be determined which projector pixel illuminated a specific part of the scene/object imaged or viewed by a specific camera pixel. The correspondences may be established between fractions of pixels of projector and camera. These correspondences can later be used to construct a 3D model, to calibrate a projector or for other purposes.

The image produced by the camera, unfortunately, can be quite unclear due to a number of sources of error or blurring. As mentioned above, these sources can cause the resulting image to be quite degraded. These sources of error may be generalized as coming from three main sources: the projector, the scene, and the camera. The resulting degradation in the image can thus be seen as a result of the combination of the effects of the three error sources. The image formation can therefore be modeled as a triple convolution of the projector, the scene, and of the camera. Unfortunately, the point spread function (PSF) of each of these three is responsible for the blurring of the resulting image.

It must be noted that the PSF of the system as a whole depends on the physical characteristics of the projector and camera and, indeed, on the characteristics of the system as a whole. It varies as well with the distance of the surface to be scanned as well as the orientation of the scene or object. The PSF also varies with the positioning of the pixels on the detection chip of the camera and on the projection surface of the projector.

In order to recover the non-degraded image, a deconvolution needs to be performed. The deconvolution would recover an approximation of the image without the degradation introduced by the PSFs of the three sources of error. The deconvolution would therefore recover a more accurate or non-blurred image of the subject. To assist in the deconvolution, the PSF of the system (the combined PSFs of the projector, the scene, and of the camera or a combined PSF of any combination of the PSFs of the projector, the scene, and of the camera) can be estimated beforehand using an image of a standard target for PSF determination. Also, since the deconvolution process has some known issues (such as sensitivity to noise, instability, and others), these issues can be compensated for by using the specific characteristics of the structured light system when iteratively deconvolving the image. As well, to help in the stabilization of the deconvolution, a segmentation process may also be performed on the image.

It should be noted that the term "segmentation" in the context of this document is to mean "segmentation" in the field of computer vision and image processing. In computer vision and image processing dictionaries, segmentation is defined as the grouping (or classification) of image pixels into meaningful, usually connected structures such as curves and region. The term is applied to a variety of image modalities, such as intensity data or range data and properties, such as similar feature orientation, feature motion, surface shape or texture.

In the field and context of structured light systems, the above definition holds true. Structured light systems operate by projecting light with known properties onto a surface, and by using a camera to identify the characteristic of the originating light. Some structured light patterns use a small number of different values of the characteristic used for identification (e.g. color or intensity values). As an example of this, structured light systems often use binary patterns (black and white shapes). With such systems, each pixel of a camera can be classified as being lit by a black or white part of the pattern projected by the projector. In such a system, it is expected that neighbour pixels belong to the same class (here, black or white) and it is expected that those pixels would form regions with a shape that depends on the characteristic of the light system and the shape of the object being imaged. Another possible structured light system maximizes the number of classes in the segmentation by using a pattern consisting of a gray scale gradient with all pixels on the same row or column having the same gray level value. For such a system, the number of classes that can be identified can be close to the number of gray levels that a camera can measure. The process of classifying or grouping pixels using a gray scale gradient is still considered as segmentation since, for such a gray scale gradient based system, it is expected that neighbouring pixels belong to the same class, and it is expected that these neighbouring pixels would form region with a shape that depends on the characteristics of the system and on the shape of the object being acquired or imaged.

Some of these characteristics of the structured light system which can be used to assist in the deconvolution and in the segmentation processes may be summarized as follows:

the structure of the projected patterns
   shapes present in the pattern
   numbers of colors or gray levels used in the patterns
   expected intensities for each color or gray level
the physical configuration of the structured light system
   the position of the camera and the projector (the geometric calibration of the system)
   the type of the projector used (e.g. whether the projector is an LCD, a DLP, color, or analog projector)

the type of camera used (e.g. whether the camera is a color or a gray level camera)

a distance of the object or scene from the scanner known characteristics of the scene or object being scanned surface texture (e.g. whether the surface of the object or scene is smooth or textured and what type of texture)

surface geometry (e.g. the rate at which the surface orientation changes)

the number of the objects within the scene

Of course, other characteristics of the structured light system may also be used.

Once a non-blurred or more accurate image is obtained using the segmentation and deconvolution processes, the correspondences between the camera(s) and the projector(s) in the structured light system can be more easily obtained using the non-blurred image.

The method of the invention can therefore be summarized as having four main steps:

obtaining images from a structured light system determining characteristics of said structured light system iteratively segmenting and deconvolving the images using the characteristics of the structured light system (including the point spread function of the structured light system) to result in a more accurate resulting image of the subject and, optionally, establishing correspondences between cameras and projector using said non-blurred resulting images.

The iterative aspect of the method may terminate once a preset or predetermined point has been reached. As an example, the method may be terminated once a specific fidelity or clarity of the image is reached. Or, as another example, the method may be terminated once the objective improvement between two successive images produced by the method is lower than a predetermined or given value.

While the sample implementation given below uses a Gray code pattern, other patterns may also be used. These patterns can be classified into three primary categories:

direct codification neighborhood codification time-multiplexing codification

Codes from the direct codification category use single patterns that contain all the information needed to establish the correspondence between the projector pixel and the camera pixel. Such patterns are sensitive to noise. Neighborhood codification patterns establish a sparse correspondence between the pixels using a single pattern. To counteract noise sensitivity for these patterns, the spatial resolution is reduced.

Within each category of these patterns, the patterns may be further sub-categorized into three other sub-categories based on intensity:

binary intensity gray level intensity color intensity

The invention described may use patterns from any combination of the primary and secondary categories. In the example which follows, the Gray code used is a member of the time-multiplexing primary category and of the secondary binary intensity category. However, as noted before, any pattern from any of the categories above may be used with the invention.

It should be noted that other patterns may be used as well. Rather than using patterns with white and black stripes, patterns that contain gray level values arranged as a ramp, a triangular wave, a sine wave, or arranged as any other waveform may be used. A single waveform may be used or multiple waveforms (perhaps with different phases) may be used. The acquired images with these waveform based patterns projected on the subject can then be deconvolved and segmented individually or as a group using the regularization terms described below. The resulting image or images (which would be more accurate images of the subject) can then be computed from these acquired or initial images.

Combinations of these resulting images may also be computed from these results of the deconvolution and segmentation processes. Someone skilled in the art of signal processing could further process those combinations of de-blurred or more accurate images to obtain the correspondence between a projector and a camera of a structured light system. Alternatively, any combination of the blurred or initial images (whether they are linear combinations or otherwise) can be computed and then deconvolved and segmented. The results of the deconvolution and segmentation of these combined images can then be used by someone skilled in the art of signal processing to compute the correspondence between projector and camera.

As will be seen below, the known characteristics of the pattern used can be used to advantage in the deconvolution and segmentation process. In the example that follows, the Gray code is used and patterns of this code can be segmented into 2 classes (black and white). Also, the intensity of each class (black class or white class) as measured by the camera is known.

In another example of the type of previous knowledge which may be used, a neighborhood codification code has 8 different colors such that each intersection composed of 4 pixels has a unique arrangement of colors; a specific pattern may be segmented into 8 specific classes (each class corresponding to a specific color). For each color or class, the intensity as measured by the camera in absence of blurring is known, and it is also known that the pattern uses a rectangular grid. Such knowledge can be used in the deconvolution process in order to reduce the impact of issues such as sensitivity to noise and instability.

For all cases of patterns, parts of the structure of the pattern are lost when the patterns are projected or "applied" to the scene by the projector. This deformation of the structure of the pattern is expected and, by using a reasonable hypothesis regarding the surface of the scene or object, large parts of the structure of the pattern remain. This remaining structure can then be used to regularize or stabilize the deconvolution.

It should be noted that the detailed implementation given below is only one of many possible implementations. The steps taken to practice the invention follow the general concept outlined above but its implementation need not exactly follow the steps detailed below. As an example, the implementation below uses a second image which is simply the first image with the intensities reversed (i.e. the black areas are now white and vice versa). This step need not be followed for other implementations and, indeed, are not necessarily required for the implementation detailed below.

It must also be noted that while the implementation below uses a foreknowledge of the pattern (i.e. that it is simply a black and white or binary pattern), the principles used are equally applicable to non-binary patterns (e.g. gray scale or color based patterns).

The implementation of the invention described below provides systems and methods for processing images so that they may be used in applications such as the reconstruction of 3D scenes. A black and white first image is provided. A second black and white image, an identical but color opposite of the first image is also provided. A third image, which is an undegraded or non-blurred version of the difference of the first two images, is then generated by simultaneously deconvolving and segmenting a degraded version of the third image. This is accomplished by deconvolving the degraded version of the third image from the point spread function of the system while using specific regularization terms. These regularization terms, which assist in the segmentation of the degraded version of the third image, are based on the probability that two pixels adjacent to each other in the degraded version belong to different classes or colors. The system which generates the first image may be a structured light system and the first image may be generated by projecting a known light pattern on to a specific scene. Once the non-blurred third image is obtained, the correspondence between the various cameras and projectors in the structured light system can be more easily determined using this non-blurred third image.

The implementation detailed below involves using at least one initial image and generating at least one interim image derived from the initial image. Other implementations which involve generating or deriving multiple interim images, derived from any number of initial images or even derived from any number of interim images, may also be used. The interim images and the initial images may be combined in any way suitable to provide a useful input to the deconvolution and segmentation process.

The present invention explicitly models the blurring induced by the limited depth of field (camera and projector) and reduces the impact of the other error sources by using regularization. Blurring was described as a significant limitation of digital projector profilometry [1] and the present invention allows a significant improvement when working out of focus which occurs when performing depth measurement. The present method iteratively performs a deconvolution and a segmentation of the patterns. Moreover, it takes into consideration the projected displacement which is induced by the camera, the projector and the scene configuration. This allows the use of regularization terms which are geometrically plausible.

Described below are specific implementation details of one embodiment of the invention. These details are implementation specific and need not be taken as being specifically necessary to or limiting in any way as to the scope of the present invention.

In one aspect of the invention, the method takes as input two images G and R of size m×n. The first image, G, is an image of a static scene acquired while one of the Gray code patterns is projected. The image R is simply G with white and black stripes reversed and R(q) is the intensity of image R at pixel q. Using G and R allows an increase in robustness and we define I=G−R. When neglecting the noise, the image formation for I is described as I(q)=H(q) ⊛ X(q) where X is the non-degraded image of G−R and H is the Point Spread Function (PSF) of the system which depends on the projector, the camera and the scene configuration. Note that this is different from conventional deconvolution where blurring is introduced only by the camera lens. The system PSF will be further described below and for now the system PSF will be assumed to be spatially invariant. With H and I known, the non-degraded image is the one minimizing $$\|Hx-i\|^2 \tag{1}$$

where H is an mn by mn block Toeplitz matrix with Toeplitz blocks representing the convolution with the PSF H [9]. The vector x and i are stacks of the columns of the images X and I respectively and are of length mn. Since this deconvolution is ill-conditioned the invention simultaneously segments and deconvolves the image I using the result of the segmentation to regularize the deconvolution. There is added a regularization term based on the heuristic that two neighboring pixels should have the same intensity if they belong to the same class (i.e. they are either white or black). This allows the reduction of the impact of noise. The matrix S contains, for each two-pixel neighborhood interaction, a row with two non-zero entries corresponding to the neighbors. Those entries are 1 and −1 respectively. Explicitly, each line of Sx represents an equation of the form X(q)−X(q')=0 where q and q' are neighbor pixels. The neighborhood structure is presented further below. The regularization term is $$\lambda^2 \|M_d Sx\|^2 \tag{2}$$

where $\lambda$ is a user-defined parameter and $M_d$ is a diagonal matrix where each diagonal entry is the probability that all the pixels involved in the interaction of the corresponding row of S belong to the same class. While the previous regularization term improves the conditioning, the deconvolution is still ill-posed. In order to fix the scaling and anchor the solution, we add the regularization term $$\gamma^2(\|M_b(x-u_b)\|^2 + \|M_w(x-u_w)\|^2) \tag{3}$$

where $\gamma$ is a user-defined parameter and $M_b$ and $M_w$ are diagonal matrices for the black and white class respectively. The vectors $u_b$ and $u_w$ are the expected intensity for the black and white class respectively. They are not necessarily spatially constant. These vectors can be estimated by projecting white and black images, or approximated using the image I directly or iteratively estimated as in [24]. Diagonal entries of $M_b$ and $M_w$ are the probabilities that the corresponding pixel of X belong to the black and white class respectively. When $M_b$, $M_w$, $M_d$, $u_b$, and $u_w$ are fixed, the terms of Eq. 1, 2 and 3 form a Tikhonov regularization which may be solved iteratively [9]. The matrices $M_b$, $M_w$, $M_d$, depend on the segmentation which is described below.

The segmentation is accomplished by first defining that the set P contains the pixels of image X and the set L={w, b} contains the label for white and black pixels. A L-configuration C:P ↦ L associates a label to every pixel of P. The probability of a configuration C given X is $$p(C|X) = \frac{1}{Z} \prod_{q \in P} p(q|C(q)) \prod_{(q,q') \in N} p(C(q), C(q')) \tag{4}$$

where Z is the normalization factor of the Bayes formula and N is the set of pair of neighbor pixels. The probability p(X(q)|C(q)) is a Gaussian distribution having mean identical to those of $u_b$, and $u_w$. In one implementation, the variance is assumed to be equal for both classes. We observed that those hypotheses are acceptable. Also, p(C(q),C(q')) is the probability of having a class transition between the pixels q and q'. This is related to the projected displacement presented below. For each pixel q, in order to deconvolve X, there is needed the probabilities p(C|X,C(q)=b) and p(C|X,C(q)=w), that is the probabilities of the most likely segmentation of image X with the pixel q having the label black and white respectively. These probabilities can be approximated using loopy Belief Propagation which must compute these in order to find an approximate solution to the maximization in C of Eq. 4 [31]. Note that for this segmentation, the regularization is based on a geometric model and does not attempt to reduce the noise which is handled in Eq. 2.

The method starts by evaluating p(C|X,C(q)=b) and p(C|X,C(q)=w) for all pixels q which are used to fill the matrices $M_b$, $M_w$. Here, we denote the diagonal entry of $M_b$ corresponding to pixel q as $M_b(q)$: it is set to p(C|X,C(q)=b). The matrix $M_w$ is similarly filled and each row of $M_b$ and $M_w$ is then normalized such that $M_b + M_w = I$. The matrix $M_d$ can be computed from the normalized $M_b$ and $M_w$. The diagonal entry of $M_d$ corresponding to two neighbors q and q' is $M_b(q)M_b(q')+M_w(q)M_w(q')$. The energy function containing the terms of Eqns. 1, 2 and 3 can be minimized using gradient descent or other known methods. A few gradient descent iterations are performed before the re-computation of the probabilities. Those steps are repeated until a non-ambiguous segmentation of X is obtained or until a maximum number of iterations is reached. In one implementation, the first segmentation is performed directly on I.

Figure 1:
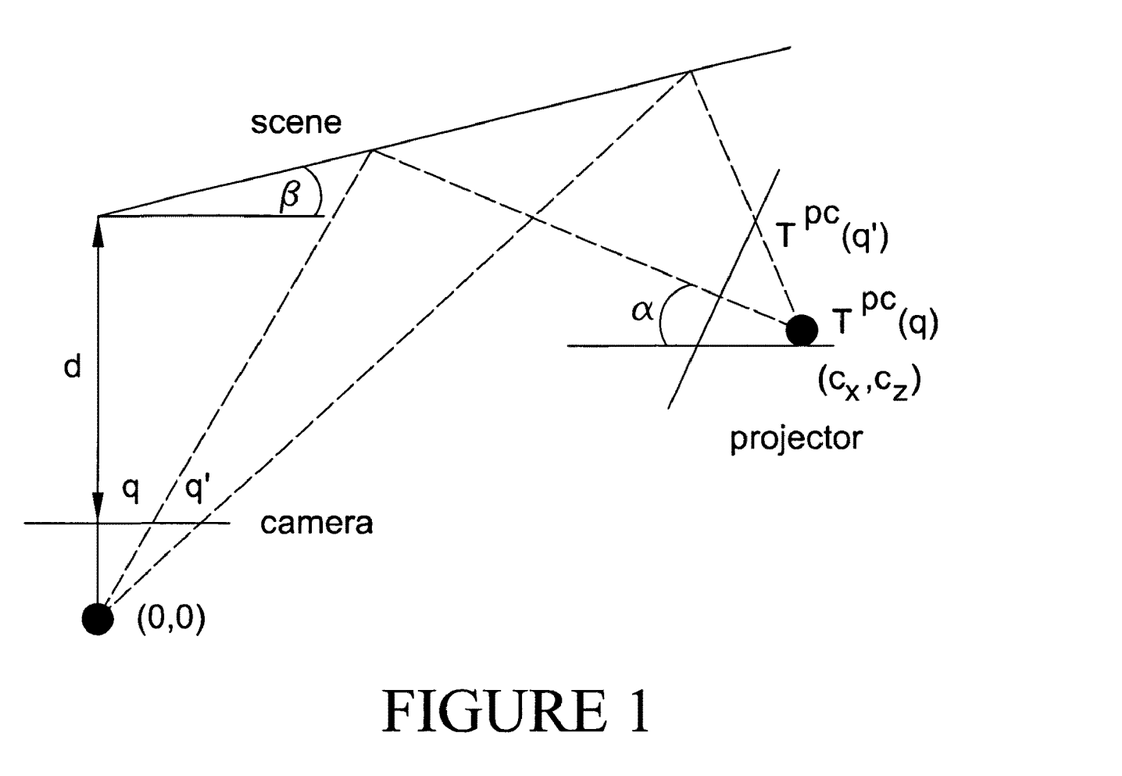
FIG. 1 is a representation of a structured light system.

The class transition probabilities used in the previous section depend on the 3D structure of the scene. Explicitly, they depend on the projected displacement which is induced by the scene geometry and the internal and external parameters of the projector and camera. FIG. 1 illustrates a 2D projector-camera system with a planar scene.

In FIG. 1, the distance along the optical axis between the camera and the scene (which is a plane) is d. The angle between the camera's image plane and scene plane is β, and α is the angle between the projector's optical axes and the camera's image plane. The center of projection of the projector is $(c_x, c_z)$. The camera pixels q and q' correspond to projector pixel $T^{pc}(q)$ and $T^{pc}(q')$ respectively.

Figure 2:
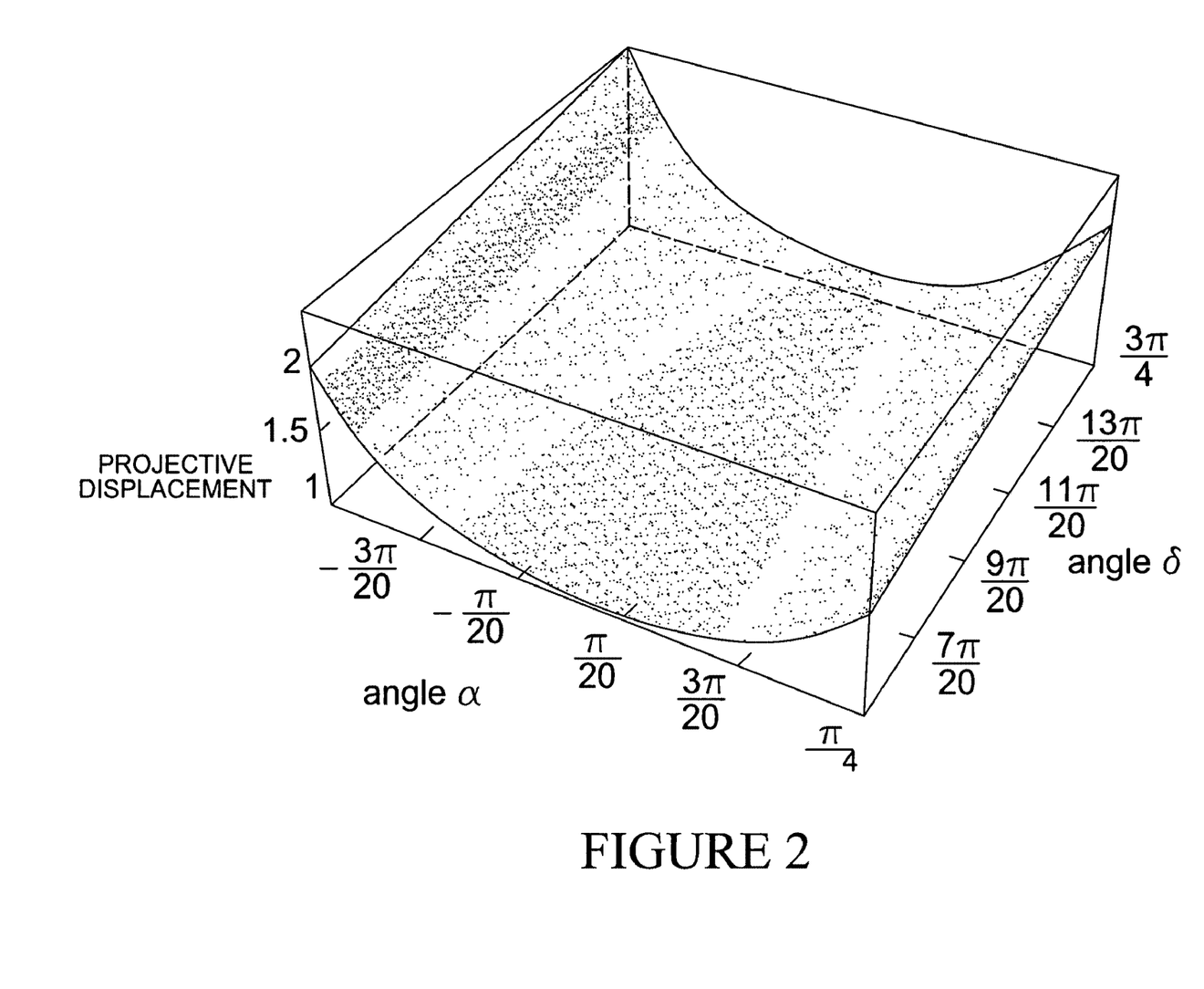
FIG. 2 illustrates a projected displacement as a function of angles for a projector and a camera.

Using FIG. 1 as a reference, the projected displacement ΔD is $$\Delta D(q,q')=T^{pc}(q)-T^{pc}(q') \quad (5)$$

where $T^{pc}$ is a function that applies the homography between the projector plane and the camera plane. FIG. 2 shows, for a 2D camera-projector system, the value of the projected displacement ΔD for varying angles α and β. Note that the variation is non-negligible. Also, ΔD is a scalar rather than a vector in this 2D case.

Referring to FIG. 2, the image illustrates the projected displacement as a function of angle α and β for a projector and camera having a focal length of 5 and a sensor element size of 0.1. The distance along the optical axis between the camera and the plane is 200. The projector is located at (20, 0) and the camera is located at the origin.

Figure 3:
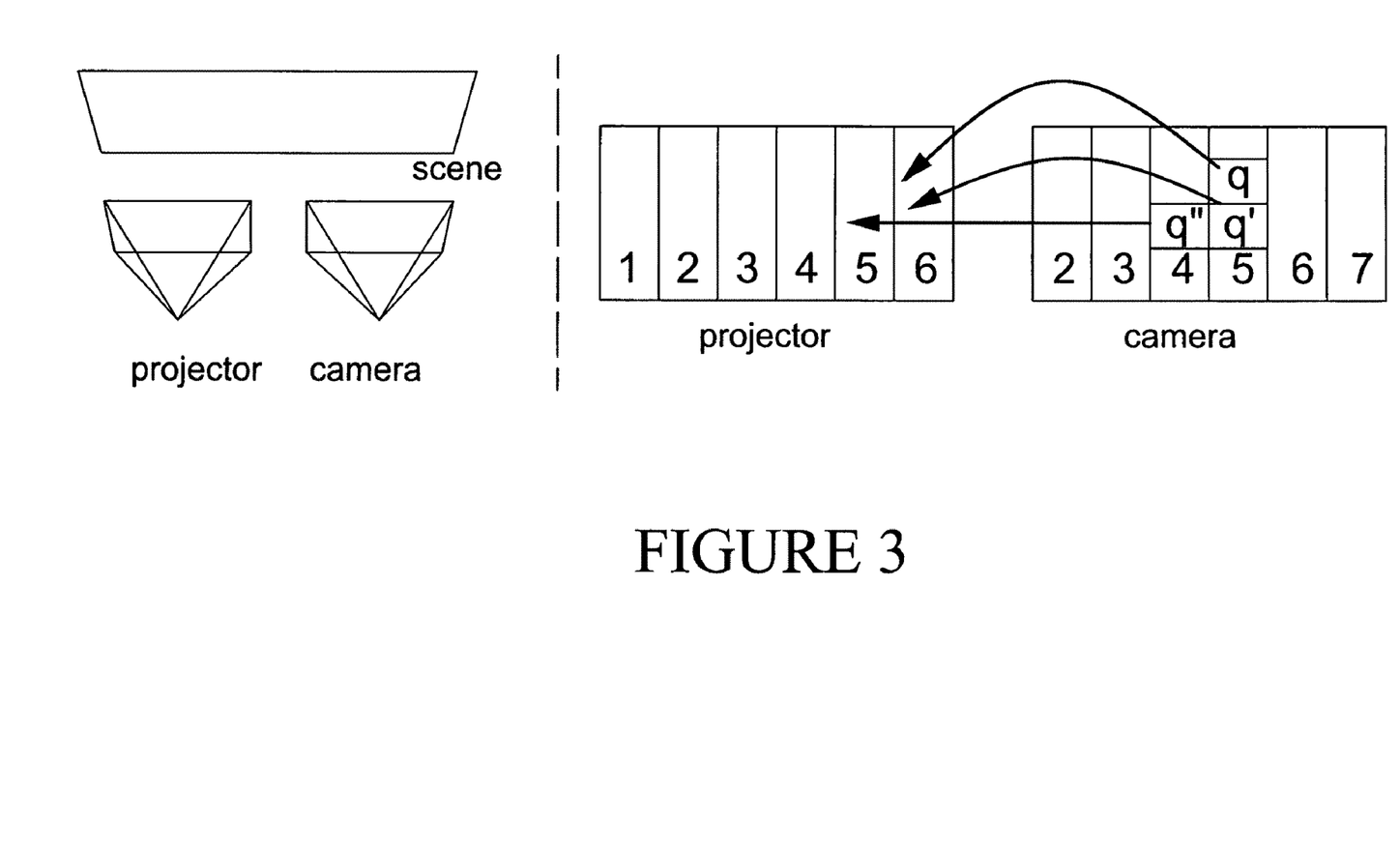
FIG. 3 is a schematic of a rectified projector-camera system with a fronto-parallel scene and a mapping of a camera pixel to a projector column for the rectified projector-camera system.

For now, it will be assumed that the camera and projector planes are rectified and that the scene is a single plane which is fronto-parallel to the SL system (see left side of FIG. 3) [10]. In this case, the image viewed by the camera is that of the projector shifted along the horizontal axis. The magnitude of this displacement (the disparity) depends on the depth of the plane in the scene. The right side of FIG. 3 shows the camera and projector images corresponding to such a scene when the stripes in the projector (and camera) are one pixel wide. The camera pixels q and q' belong to the class black and correspond to the same column in the projector. ΔD(q, q') is (0, 0), while pixels q' and q'' belong to different classes and are necessarily from adjacent columns (4 and 5) in the projector and ΔD(q', q'')=(1, 0). When a smoothing penalty is applied between the labels of q and q', the presence of a depth discontinuity is penalized. However, when smoothing is applied between q' and q'', the absence of a depth discontinuity is penalized since a configuration having q' and q'' match with the same projector pixel is favored. Thus, according to this rectified and fronto-parallel model with one pixel wide vertical stripes, the probability of transition between q' and q'' is 1, while it is 0 between q and q'. For a calibrated SL system in a general configuration, those probabilities can be estimated from the calibration parameters and the expected geometry of the scene. In one implementation, for the narrowest stripe, the probability of transition for horizontal neighbor was set to 0.5. This corresponds to a transition occurring at every 2 camera pixels and is the targeted value for a 3D scanner that would use the present invention. For the vertical transitions, the probability is set to 0.15. This is a crude estimate based on the number of distinct objects expected in the scene and the slant of the surfaces (i.e. we expect 15 transitions in an interval of 100 pixels). Note that the neighborhood interaction having a transition probability of 0.5 can be removed from N. This allows the use of a 2-connected neighborhood, making it possible to compute the exact conditional probabilities using dynamic programming. Note that, as the stripes become wider, the difference between horizontal and vertical transition probabilities becomes smaller since there are far less horizontal transitions that are expected, and the number of vertical transitions is expected to remain the same. Since those wide stripes are less ambiguous, it is preferred that a 2-connected neighborhood for all patterns be used. This results in a reduction of the computational burden without affecting the quality. The same neighborhood structure in Eq. 2 was also used in Eq. 4.

The system PSF H used in our method is defined as $H(q)=H_c(q) \circledast W(q) \circledast H_p(q)$ where $H_c$ and $H_p$ are the PSF of the projector and camera and these vary with the distance to the scene. These are conventional lens PSFs, while W is the scene convolution matrix which depends on the distance to the scene, the calibration parameters of the SL system and surface properties. As an example, on the rectified configuration with a fronto-parallel scene of FIG. 3, W would be a horizontally shifted diagonal matrix. The magnitude of the shift is equal to the disparity, and the magnitude of the diagonal entries depends on the surface albedo. Note that H may not sum to one because of the surface albedo. In the present invention, it is assumed that H does sum to one. However, the components of $u_b$, and $u_w$ vary spatially and this allows the method to accommodate for the albedo of the scene.

Since it is expected that the scene depth will vary, the system PSF will also vary across the image. Many PSF representations have been designed to cope with spatially varying PSF [3, 15, 25, 7, 18]. Some of these approaches assume that the PSF is piecewise constant [15, 25, 7, 30], while others use coordinate transformations [27, 23], and some others use interpolation of the PSF across the image [3, 25, 18]. For this implementation of the invention, an interpolation approach based on an Karhunen-Loève decomposition of the PSFs [18] is used. It allows a compact orthogonal decomposition of the PSFs. The bases are denoted $H^k$. The minimization of Eq. 1 with regularization terms 2 and 3 becomes $$\left\| \sum_k H^k C^k x - i \right\|^2 + \text{regularization} \quad (6)$$

where $C^k$ is a diagonal matrix. Each diagonal entry is the coefficient that scales the individual pixel of x prior to the convolution. More details can be found in [18]. The focus for this invention is on the image processing aspects of the pattern segmentation and it is assumed that the PSFs at different points in the image are known. The PSFs for other points are interpolated. We thus have all $H^k$ available beforehand, and the $C^k$ are estimated based on the correspondences obtained without the present invention.

During the deconvolution step of the invention, the most computationally expensive operation is the computation of $H^k C^k X$ which is performed using a FFT [9]. The convolution for all Karhunen-Loève bases can be computed simultaneously. There are many commercially available products that could be used to efficiently perform 2D FFT on programmable hardware. The regularization terms of Eq. 2 and Eq. 3 can be computed in linear time. The minimization of Eq. 6 is performed using a simple steepest descent method which converges slowly. Faster methods for calculating these the above also exist [9].

The segmentation can also be implemented on programmable hardware. An implementation of belief propagation on graphics hardware is presented in [4]. When using a two-connected neighbourhood (as in one implementation of the invention), all the columns can be processed simultaneously. It is possible to further increase the amount of parallelism by reformulating Eq. 4. This reformulation is presented further below, and, in one implementation, was implemented using off-the-shelf graphics hardware. The decoding of SL patterns using a 1024×768 camera is accomplished at a rate of more than 120 patterns per second using an old NVIDIA 6800 graphics card. General purpose computation using graphics hardware has greatly evolved in the last few years and the invention can be implemented using the high-level programming language CUDA [12]. Other, newer graphics cards may also be used.

Since the steps of the method of the invention can be implemented on programmable hardware, an implementation of the invention running at video frame-rate is possible. One current software implementation of the invention runs on a computer with 8 Dual-Core AMD Opteron 8218 processors. At most, 6 cores are used simultaneously. The FFT code and BLAS implementation of the ACML are used also used in this implementation [11]. This implementation also uses the standard FFT driver of the ACML with OpenMP support enabled [13]. This implementation, which is non-optimized, processes one 640×480 image in 20 seconds. Other implementations which use single or multiple core processors are also possible. As may be imagined, parallel processor architecture based computers, properly programmed, may provide better results than uniprocessor based machines.

Figure 4:
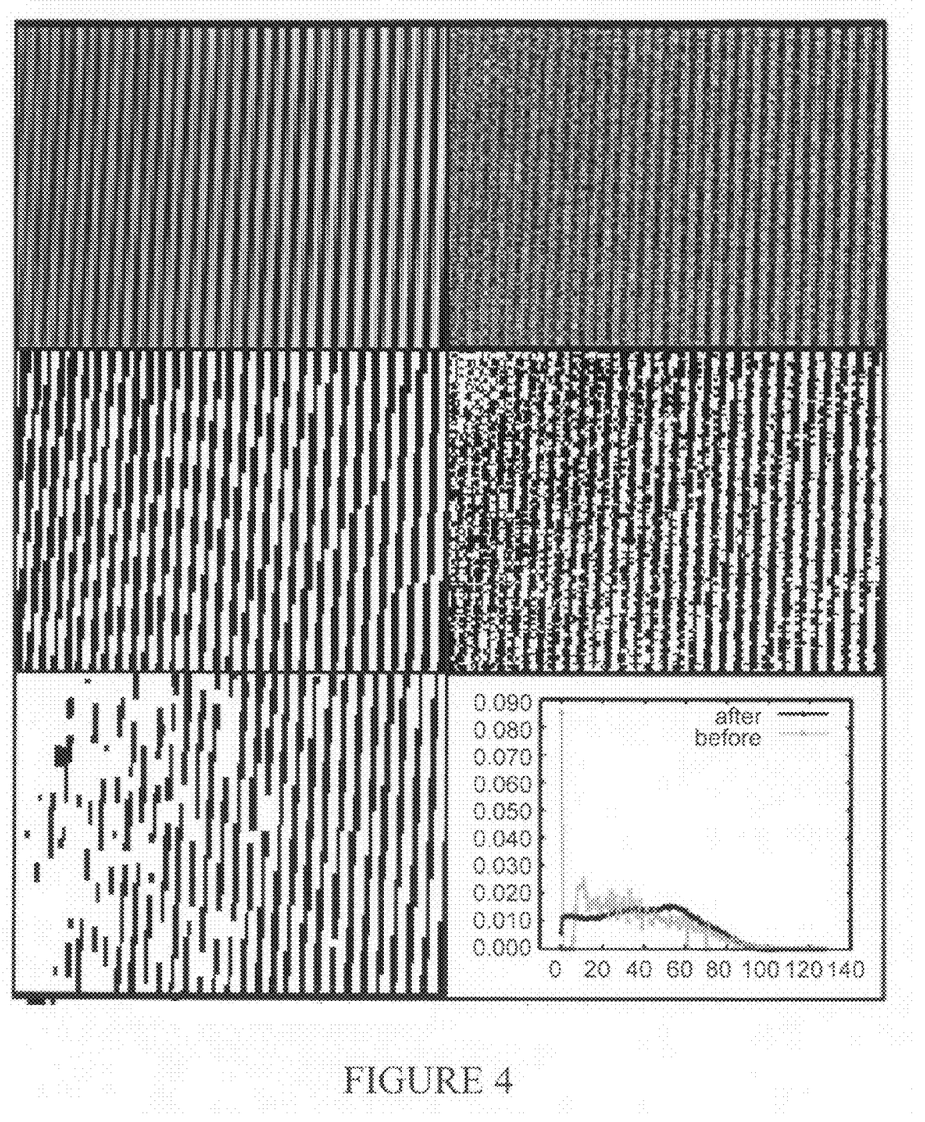
FIG. 4 illustrates results using the present invention and methods of the prior art.

Regarding results using one implementation of the invention, FIG. 4 contains an example of Gray code decoded under difficult acquisition conditions. The scanned image was acquired with both camera and projector out of focus and with a low SNR. The scene is composed of a single tilt plane, thus making it easier to assess the quality of the segmentation by visual inspection. The top left image in FIG. 4 illustrates the deconvolved image obtained by the present invention. The top right image in FIG. 4 is the original image. The middle left image is the result of one aspect of the invention while the middle right image is the result of standard thresholding methods. The bottom left image results from a Markovian segmentation while the bottom right image shows the difference histogram between the threshold value and the pixel intensities.

Referring again to FIG. 4, the result obtained by standard thresholding is shown [26]. Note how noisy the segmentation is. We also provide the results when segmenting using a Markovian framework. The method of [29] applied to one pattern was used. The method did significantly over-smooth the left part of the image.

This over-smooth solution and the noisy one of thresholding are explained by the histogram of the distance between the threshold value and the pixel intensities (see bottom right image in FIG. 4). More than 8.6% of the pixels have an intensity equal to the threshold value, thus making those very difficult to classify. In our deconvolved image (see top right image of FIG. 4), less than 0.6% of the pixels are in this situation, thereby making the segmentation much easier to perform.

Figure 5:
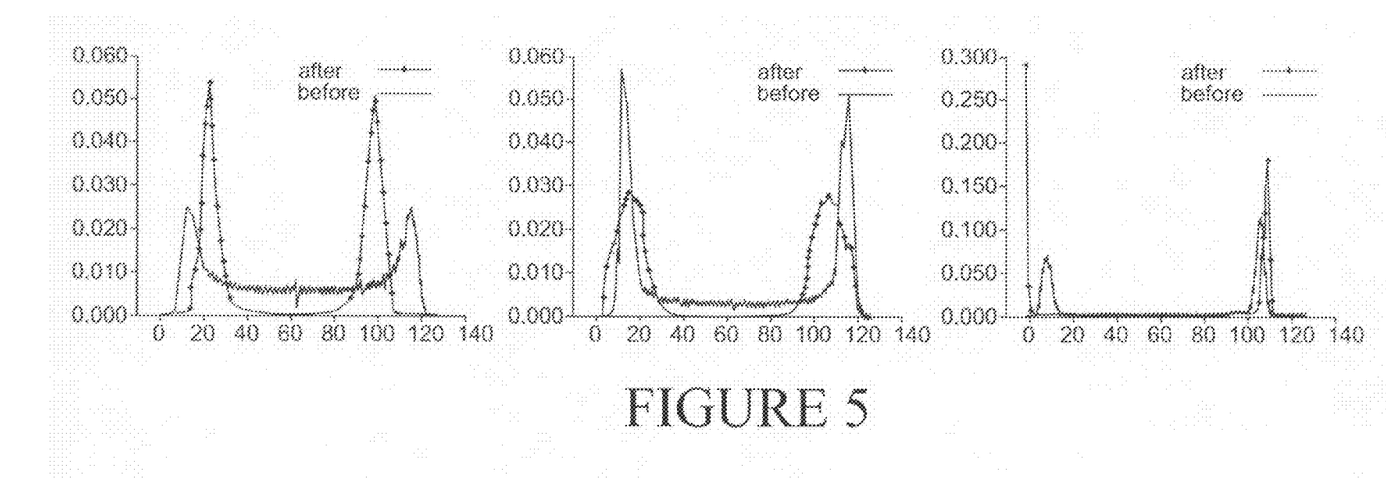
FIG. 5 shows intensity histograms before and after the present invention is applied.

FIG. 5 contains the intensity histogram of the images before and after the deconvolution for different sizes of stripes. The histograms in FIG. 5 are for the second, third, and fifth patterns of the Gray code. The images of the first pattern are shown in FIG. 4. Referring to FIG. 5, the reduced inter-class ambiguity after applying the deconvolution should be noted. The pattern with large stripes are easier to decode since they contain fewer transitions. As an example, with the fifth pattern, both images have very few ambiguous pixels. Nevertheless, the number of pixels having an intensity in the interval ranging from 50 to 80 in the deconvolved image is smaller than the original by an order of magnitude (the class transition occurs at an intensity reading of 63).

Figure 6:
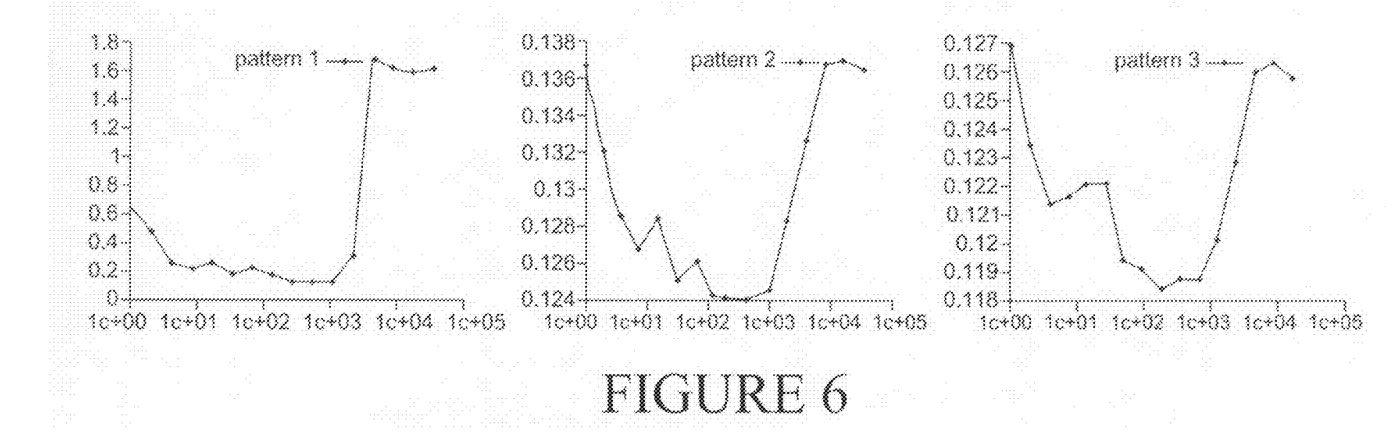
FIG. 6 provides graphs that show the resistance of change of $\lambda$ for patterns 1 to 3 of Table 1.

Since linearity is preserved under projective transform, a linear regression was performed along each label discontinuity in the camera. The residual error of the fit was used as a metric to compare our approach with standard decoding on the different patterns. Table 1 presents the results. The most significant improvement is for the pattern with the narrowest stripes. FIG. 6 contains graphs of the variation of the residual error with the change of $\lambda$ for the patterns 1 to 3 of Table 1. Note that the minimum residual error occurs with the same $\lambda$ for all patterns. In our tests, we observed that the best $\lambda$ is related to the noise level and seems independent of the width of the stripes. Note that $\gamma$ was set to 0.5 in all our experiments. While $\lambda$ is used to suppress noise, $\gamma$ weighs the energy term of Eq. 3 which anchors the solution. This value was appropriate in the tests performed and the method is much less sensitive to changes of $\gamma$ than of $\lambda$.

TABLE 1

Residual error for different Gray code patterns

| pattern index | standard | ours |
|---|---|---|
| 1 | >0.351 | 0.127 |
| 2 | 0.150 | 0.125 |
| 3 | 0.180 | 0.133 |
| 4 | 0.138 | 0.133 |
| 5 | 0.143 | 0.139 |
| 6 | 0.143 | 0.134 |
| 7 | 0.129 | 0.114 |
| 8 | 0.190 | 0.157 |

Referring to the entries in Table 1, pattern 1 has the narrowest stripe. The images of the first pattern are shown in FIG. 4. For this pattern, some stripes are interconnected in the solution obtained by standard thresholding and they were manually removed before computing the error. This manual removal is arbitrary and the most conservative values that could be obtained are shown.

Figure 7:
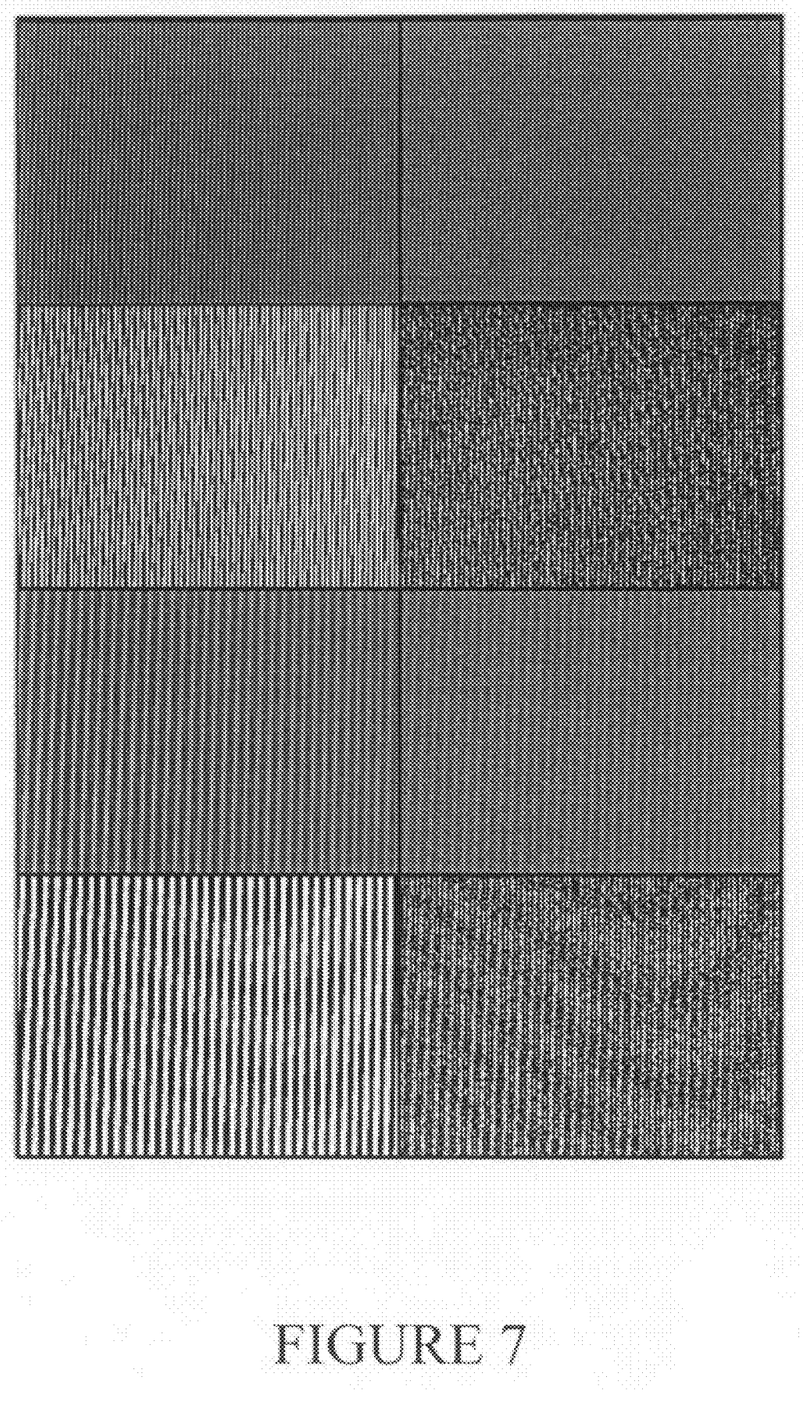
FIG. 7 illustrates the results for two patterns using the present invention and methods of the prior art.

FIG. 7 shows the images associated with a scan of planar surfaces acquired in even harder conditions. The top 4 images are for a pattern with narrow stripes. The bottom 4 images are for a pattern which had wider stripes. For each data set or grouping of four images, the top left image shows the deconvolved image obtained by the invention, the top right image shows the original image, the bottom left image is the end result from applying the invention, and the bottom right image is the result of standard thresholding.

Using the conditions under which the scans of FIG. 7 were obtained and the patterns detailed in Table 1, the first 3 patterns in Table 1 were difficult to segment and standard thresholding yielded useless results for those patterns. Between 30% and 66% of the pixels have the same intensity in both images G and R. In the deconvolved image this percentage of pixels with the same intensity drops to 3.3%, allowing a significant improvement in the decoding.

Figure 8:
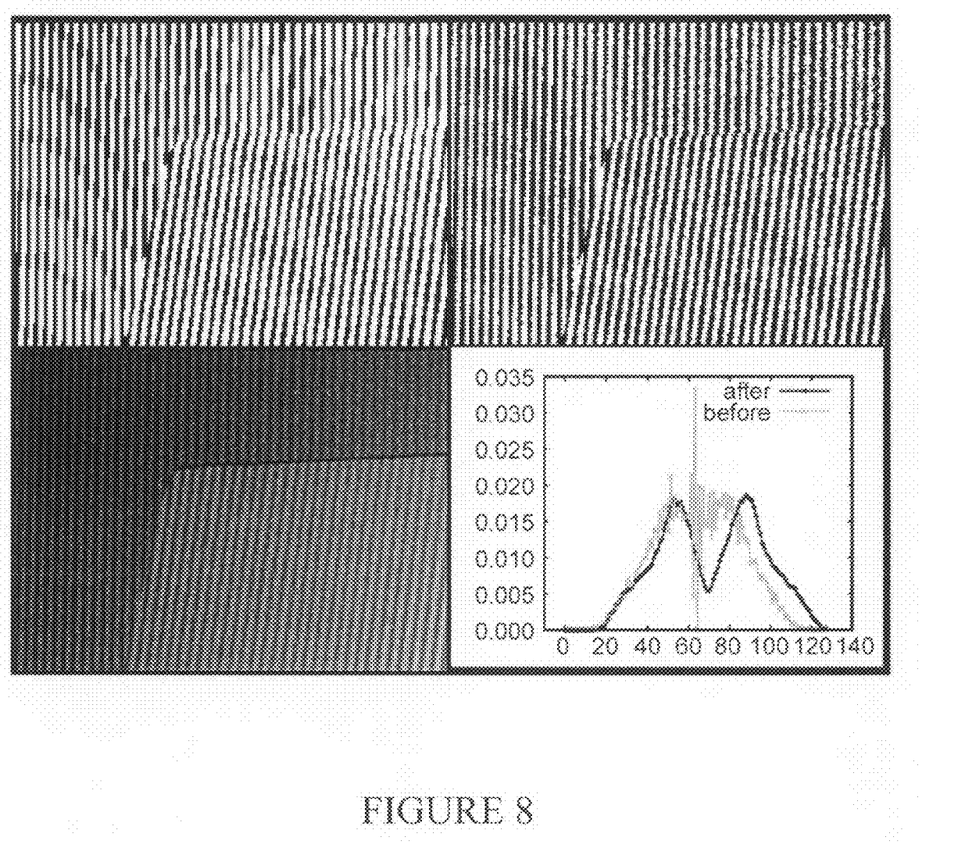
FIG. 8 illustrates the results for a scan of two planes with different orientations using the present invention.

FIG. 8 shows the images associated with a scan of two planes with different orientations. In FIG. 8, the top left image is a result of an application of the present invention while the top right image is a result of standard thresholding methods. The bottom left image is the original image G (normalized for visualization) while the bottom right image is an intensity histogram which contains some discretization artefacts.

Figure 9:
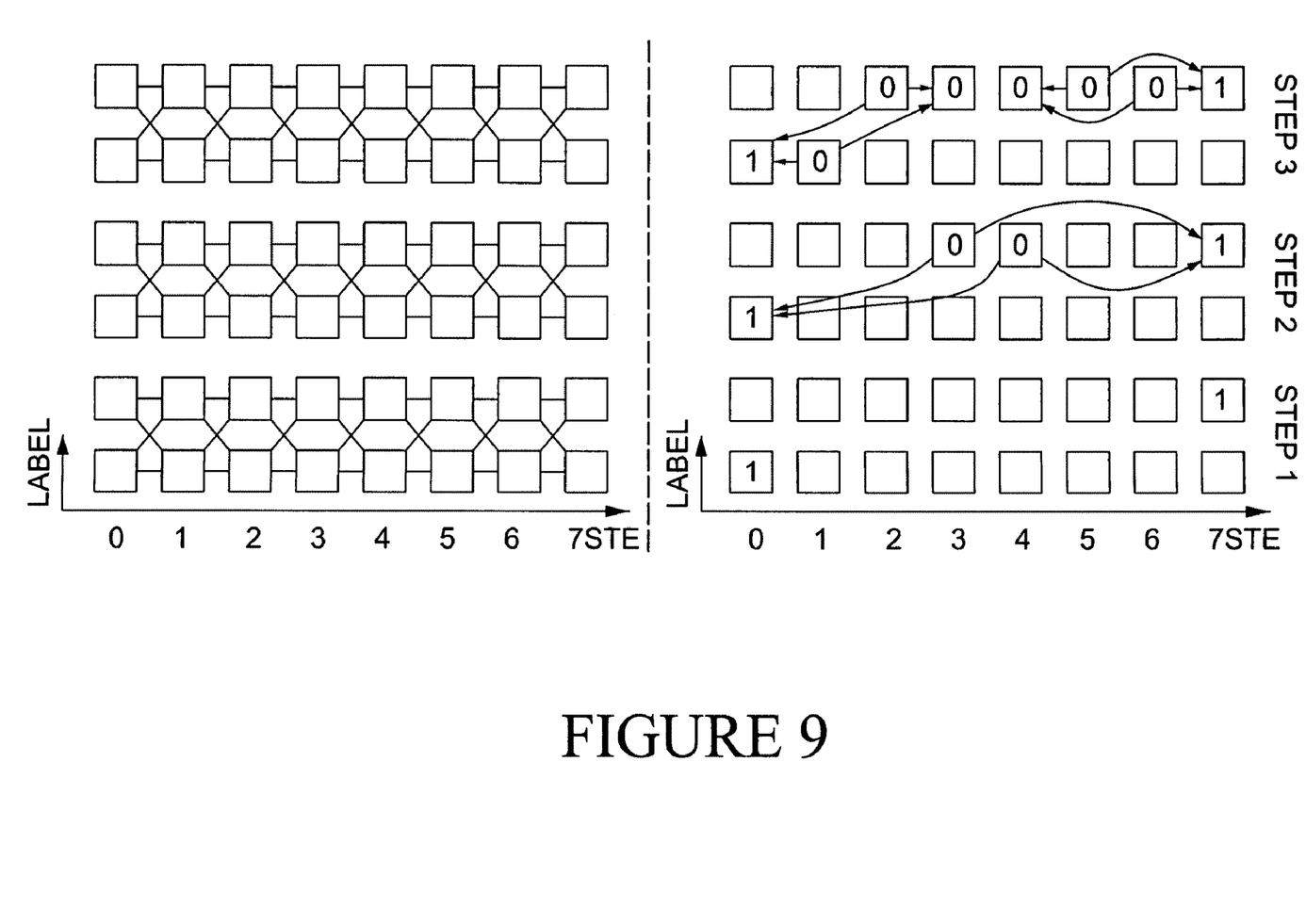
FIG. 9 is a schematic diagram illustrating the concept of a divide and conquer strategy which may be used when implementing the invention.

Regarding the implementation of the present invention and computational enhancements which may be used, when the neighborhood of Eq. 4 is 2-connected, the optimal solution can be computed using Dynamic Programming (DP). The maximization of Eq. 4 can be reformulated as an energy minimization with a Potts smoothing model [19]. The division and multiplication of the maximization are replaced by summation and subtraction in the minimization framework, making it more attractive for an implementation using programmable hardware. More details can be found in [19]. When a Potts smoothing model is used, DP has a complexity of $\Theta(N \cdot L)$ where N is the number of sites and L is the number of labels [8]. The depth of the recurrence relations is linear in the number of sites. Lui et al. proposed a GPU-based Smith-Waterman DP that exploits the parallelism already present in the standard recursive formulation [21]. A divide-and-conquer strategy may be used and a reduction of the depth of the recurrence relation may be accomplished in order to increase the amount of parallel computation. This is done at the cost of increasing the total amount of computation. It is assumed that the number of sites on a DP line is a power of two. If the number of sites on a DP line is not a power of two, the number of sites can be expanded to a power of two by adding dummy sites and setting their likelihood cost to a constant value. In a GPU, this can be efficiently done using the texture's clamping mode of OpenGL.

This concept is illustrated with reference to FIG. 9. FIG. 9 is a schematic illustration of a DP problem containing 8 sites and 2 labels. On the left side of FIG. 9, is the parallelization of the energy computation phase. The gray arrows represent the smoothing cost already being taken into account, while the black ones represent the smoothing cost computed at the current step. On the right side of FIG. 9 is the parallel computation of the recovery phase. The light gray boxes represent sites for which the label is fixed in the current step. The dark gray boxes represent sites for which the label has been fixed in the previous step. The number on a site is the step at which the label is determined. The arrows indicate the dependency between sites. As an example, the labels of sites 0 and 3 must be known before computation of the label of sites 1 and 2.

Again referring to FIG. 9, this use of a divide and conquer strategy and reducing the depth of the recurrence relation is illustrated on a small problem of 8 sites and 2 labels. In the first step, the energies for all the combinations of pairs of sites (0, 1), (2, 3), (4, 5) and (6, 7) are computed simultaneously. Four values are computed for each pair of sites. In the next step, the lowest energy for the combinations of labels of sites (0, 3) and (4, 7) are computed using the result of the previous step. Finally, the lowest energy for the combinations of labels of sites (0, 7) are computed. In general, this binary tree structure significantly reduces the number of steps required to process all the sites. The table $t(m_{i,j}, n_{i,j}, k, l)$ is the lowest energy of all maps of sites in the interval $[m_{i,j}, n_{i,j}]$ with site $m_{i,j}$ and $n_{i,j}$ at label k and l respectively. We define $m_{i,j} = i2^j$ and $n_{i,j} = m_{i+1,j} - 1$. Explicitly, the table t is defined inductively as $$t(m_{i,1}, n_{i,1}, k, l) = e(m_{i,1}, k) + e(n_{i,1}, l) + s(m_{i,1}, n_{i,1}, k, l) \quad (7)$$

where e(m, k) is the likelihood term related to the probability that site m has label k and s(m, n, k, l) is related to the probability that two neighbors m and n have label k and l respectively [19]. For j>1

$$t(m_{i,j}, n_{i,j}, k, l) = \min_{k', l' \in \mathcal{L}} t'(i, j, k, l, k', l') \quad (8)$$

with $$t'(i, j, k, l, k', l') = \quad (9)$$
$$t(m_{i,j}, m'_{i,j}, k, k') + t(n'_{i,j}, n_{i,j}, l', l) + s(m'_{i,j}, n'_{i,j}, k', l')$$

and where $n'_{i,j} = (2i+1)2^{j-1}$ and $m'_{i,j} = n'_{i,j} - 1$. The entry of t can be evaluated in $\Theta(N \cdot L^2)$ operations where N is the number of sites and L the number of labels. This is more than the $\Theta(N \cdot L)$ of ordinary DP with the Potts smoothing model. However, the depth of the relation for the invention is in $\Theta(\log N)$ rather than $\Theta(N)$. The minimal energy is $\min_{k,l} t(0, N-1, k, l)$ where N−1 is the index of the last site. However, the entry in table t is not what is required to minimize Eq. 6. What is required is the minimum energy of a label map having site q at label k for all q and k. This is also known as the min marginal. These values can be computed from a table $v(m_{i,j}, n_{i,j}, k, l)$ which is the lowest energy map (including all sites) with sites $m_{i,j}$ and $n_{i,j}$ having labels k and l respectively. Explicitly, the table v is defined inductively as $$v(0; N-1; k; l) = t(0; N-1; k; l) \quad (10)$$

and for $\{(m_{i,j}, m'_{i,j}, n'_{i,j}, n_{i,j}\} \otimes [0, N-1]$, $$v(m_{i,j}, m'_{i,j}, k, k') = \min_{l, l' \in \mathcal{L}} v'(i, j, k, l, k', l') \quad (11)$$

$$v(n'_{i,j}, n_{i,j}, l', l) = \min_{k, k' \in \mathcal{L}} v'(i, j, k, l, k', l') \quad (12)$$

with $$v'(i, j, k, l, k', l') = \quad (13)$$
$$v(m_{i,j}, n_{i,j}, k, l) - t(m_{i,j}, n_{i,j}, k, l) + t'(i, j, k, l, k', l').$$

The minimum energy of a label map having site $m_{i,j}$ at label k is simply $\min_l v(m_{i,j}, n_{i,j}, k, l)$. This can be computed similarly for a site $n_{i,j}$. Using the equivalence between probabilistic and energy formulations [19], the entries of table v can be converted into the conditional probabilities required in order to fill the matrix $M_b$ and $M_w$.

Sometimes, the label map of minimum energy is required rather than the min marginal. The right side of FIG. 9 shows the recovery process of this label map of minimum energy for a 2-label problem containing 8 sites. At step 1, the labels of sites 0 and 7 are computed by looking only at the minimum entry of table t for the pair of sites (0, 7). At step 2, the labels of site 3 and 4 are found by using t for the pair (0, 3) and (4, 7) combined with the result of step 1 and the smoothing cost between site 3 and 4. The process is similar for step 3, except that the results of all previous steps are needed. The label map $c^{k,l}_{i,j}$ is the lowest energy map for all sites in the interval $[m_{i,j}, n_{i,j}]$ having sites $m_{i,j}$ and $n_{i,j}$ at labels k and l respectively.

Explicitly, the label map $c^{k,l}_{i,j}$ is defined inductively as $$(c_{i,j}^{k,l}(m_{i,j}), c_{i,j}^{k,l}(n_{i,j})) = (k,l) \tag{14}$$

and for $\{m'_{i',j'}, n'_{i',j'}\} \oplus ]m_{i,j}, n_{i,j}[$ $$(c_{i,j}^{k,l}(m'_{i',j'}), c_{i,j}^{k,l}(n'_{i',j'})) = \tag{15}$$

$$\operatorname{argmin}_{k',l' \in \mathcal{D}} t'(i', j', c_{i,j}^{k,l}(m_{i',j'}), c_{i,j}^{k,l}(n_{i',j'}), k', l').$$

The depth of the relation is also in $\Theta(\log N)$. Note that the present invention scales very well with the increase in length of a DP line.

Regarding the system which may be used to implement the invention, as noted above, a suitable computer system with the proper graphics hardware may be used. For the camera and projector elements of the system, suitable off the shelf components may be used.

It should be noted that while the above description describes using Gray code patterns, other patterns known to persons skilled in the art may also be used with the invention.

The invention described above in both general terms and in one specific implementation also extends the depth of field of a structured light system. The invention allows a significant improvement when performing depth measurements when working out of focus. It should be clear that applying the present invention to 3D scanners is only one of the myriad applications for which the invention may be used for. The invention may therefore be used with many existing technologies and may be modified to work with future technologies as well.

The specific implementation of the invention described above may be summarized as being an iterative method for processing monochromatic images. This method comprising the steps of providing a first image, providing a second image, the second image being an identical color opposite of said first image such that light areas in said first image are dark areas in said second image and dark areas in said first image are light areas in said second image, and generating a third image which is a difference between the first and second images. The third image is processed as described above in order to estimate the correspondences.

For this implementation, the third step is accomplished by deconvolving the degraded version of said the image and the point spread function and by segmenting the degraded version of the third image. This step may also involve using a regularization term based on probabilities of whether specific pixels of the third image are of a specific color.

While this specific implementation utilizes a second image which is derived from the first image, other implementations may use multiple second images derived from the first image to assist the segmentation and deconvolution processes. As well, multiple first images may be obtained from the camera-projector system and these multiple first images may be used in other implementations to similarly assist in the segmentation and deconvolution processes.

It should be clear that while the description of the specific implementation of the invention above recounts a specific sequence involving segmentation and deconvolution, other sequences are also possible and are also covered as being part of the present invention. Specifically, the present invention may be implemented by segmenting and then deconvolving the image as well by deconvolving and then segmenting the image. A simultaneous segmentation and deconvolution of the image is also possible and is part of the present invention.

It should be noted that the above description describes both a general approach to implementing the invention as well as a specific implementation involving a binary stripe based pattern projected on to a subject. In other implementations, the invention may be embodied as software modules or hard-coded modules embedded in dedicated systems into which the physical characteristics of the structured light system are either entered by a user or stored (such as for fixed structured light systems). For some of these implementations, the pattern projected by the structured light system may be fixed with known characteristics. As noted above, prior knowledge regarding the pattern (or patterns) projected on to the system is desirable as such knowledge assists in the deconvolution and segmentation steps of the method.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

References

[1] M. Baker and J. Chcharo. Accuracy limitations introduced by digital projection sources in profilometric optical metrology systems. In *Conf. on Optoelectronic and Microelectronic Materials and Devices*, pages 261-264, 2004.

[2] L. Bar, N. Sochen, and N. Kiryati. Variational pairing of image segmentation and blind restoration. In *Europ. Conf. on Comput. Vision*, pages 166-177, 2004.

[3] A. Boden, D. Redding, R. Hanisch, and J. Mo. Massively parallel spatially-variant maximum likelihood restoration of Hubble space telescope imagery. *J. Opt. Soc. Am. A*, 13:1537-1545, 1996.

[4] A. Brunton, C. Shu, and G. Roth. Belief propagation on the GPU for stereo vision. In *Canad. Conf. on Comput. and Robot Vision*, 2006.

[5] C. Chen, Y. Hung, C. Chiang, and J. Wu. Range acquisition using color structured lighting and stereo vision. *Image Vision Comput.*, 15:445-456, 1997.

[6] S. Esedoglu. Blind deconvolution of bar code signals. *Inverse Problems*, 20:121-135, 2004.

[7] M. Faisal, A. D. Lanterman, D. L. Snyder, and R. L. White. Implementation of a modified Richardson-Lucy method for image restoration on a massively parallel computer to compensate for space-variant point spread function of a charge-coupled device camera. *J. Opt. Soc. Am. A* 12, pages 2593-2603, 1995.

[8] M. Gong and Y.-H. Yang. Fast stereo matching using reliability-based dynamic programming and consistency constraint. In *Int. Conf. on Comput. Vision*, 2003.

[9] P. C. Hansen. Deconvolution and regularization with Toeplitz matrices. *Numerical Algorithms*, 29:323-378, 2002.

[10] R. I. Hartley and A. Zisserman. *Multiple View Geometry in Computer Vision*. Cambridge University Press, ISBN: 0521540518, second edition, 2004.

[11] http://developer.amd.com/acml.jsp.

[12] http://developer.nvidia.com/object/cuda.html.

[13] http://www.openmp.org.

[14] S. Inokuchi, K. Sato, and F. Matsuda. Range imaging system for 3-D object recognition. In *Int. Conf. on Pattern Recogn.*, pages 806-808, 1984.

[15] J. Kamm and J. G. Nagy. Kronecker product and SVD approximations in image restoration. *Linear Algebra and its Applications*, 284(1-3):177-192, 1998.

[16] T. P. Koninckx, I. Geys, T. Jaeggli, and L. Van Gool. A graph cut based adaptive structured light approach for real-time range acquisition. In *Int. Symp. on 3D Data Process., Vis. and Transmiss.*, 2004.

[17] T. P. Koninckx, P. Peers, P. Dutre, and L. Van Gool. Scene-adapted structured light. In *IEEE Conf. on Comput. Vision and Pattern. Recogn.*, pages 611-618, 2005.

[18] T. Lauer. Deconvolution with a spatially-variant PSF. In *Astronomical Data Analysis II*, volume 4847, pages 167-173, 2002.

[19] S. Li. *Markov random field modeling in computer vision*. Springer-Verlag, 1995.

[20] Y. F. Li and S. Y. Chen. Automatic recalibration of an active structured light vision system. *IEEE J. Robotics and Automation*, 19(2), 2003.

[21] Y. Liu, W. Huang, J. Johnson, and S. Vaidya. GPU accelerated Smith-Waterman. In *Int. Conf. on Comput. Science*, pages 188-195, 2006.

[22] L. Lucchese and S. Mitra. Color image segmentation: A state-of-the-art survey. *Image Processing, Vision, and Pattern Recognition*, 67(2), 2001.

[23] S. R. McNown and B. R. Hunt. Approximate shift-invariance by warping shift-variant systems. In *The Restoration of HST Images and Spectra II*, pages 181-187, 1994.

[24] M. Mignotte. A segmentation-based regularization term for image deconvolution. *IEEE Trans. Image Process.*, 2006.

[25] J. G. Nagy and D. P. O'Leary. Restoring images degraded by spatially variant blur. *SIAM Journal on Scientific Computing*, 19(4):1063-1082, 1998.

[26] J. Salvi, J. Pages, and J. Batlle. Pattern codification strategies in structured light systems. *Pattern Recogn.*, 37(4):827-849, 2004.

[27] A. A. Sawchuk. Space-variant image restoration by coordinate transformations. *J. Opt. Soc. Am.* 64, pages 138-144, 1974.

[28] M. Sezgin and B. Sankur. Survey over image thresholding techniques and quantitative performance evaluation. *J. Electron. Imaging*, 13(1), 2004.

[29] J. Tardif and S. Roy. A MRF formulation for coded structured light. In *3-D Digit. Imag. and Model.*, 2005.

[30] H. J. Trussell and B. R. Hunt. Image restoration of space-variant blurs by sectional methods. *IEEE Trans. Acoust. Speech, Signal Processing* 26, pages 608-609, 1978.

[31] J. Yedidia, W. Freeman, and Y. Weiss. *Exploring Artificial Intelligence in the New Millennium*. 2003.

[32] J. Zhang, B. Curless, and S. Seitz. Rapid shape acquisition using color structured light and multi-pass dynamic programming. In *Int. Symp. on 3D Data Process., Vis. and Transmiss.*, pages 24-36, 2002.

We claim:

1. A method for processing images from a structured light system for use with data processing systems, the method comprising:
    obtaining at least one initial image from a structured light system, the or each of said at least one initial image being of a subject having projected on it at least one pattern by said structured light system;
    determining characteristics of said structured light system;
    iteratively segmenting and deconvolving said at least one initial image using said characteristics of said structured light system and at least one point spread function to result in at least one resulting image, said at least one resulting image being a more accurate image of said subject compared to said at least one image.

2. A method according to claim 1 wherein at least one of said characteristics of said structured light system comprises at least one of:
    shapes present in a pattern projected by said structured light system;
    a number of colors or gray levels in said the or each initial image;
    expected color intensities in said the or each initial image;
    a position of a camera and/or projector in said structured light system;
    a type of projector used in said structured light system;
    a type of camera used in said structured light system;
    a distance of an object from a scanner used in said structured light system;
    surface characteristics of at least one object in said the or each initial image;

an expected number of objects in said the or each initial image;

characteristics of said the or each pattern projected by said structured light system on said subject.

3. A method according to claim 1 wherein said at least one initial image is a combination of at least two images of said subject.

4. A method according to claim 1 wherein said method further comprises establishing correspondences between at least one camera pixel and at least a fraction of a pixel of at least one projector using said at least resulting image.

5. A method according to claim 1 wherein said step of deconvolving and segmenting includes generating at least one interim image from the or each said initial image.

6. A method according to claim 5 wherein said step of deconvolving and segmenting includes combining said at least one interim image with at least one other image.

7. A method according to claim 1 wherein said at least one point spread function comprises at least one of:
- a point spread function of at least one camera in said structured light system
- a point spread function of at least one projector in said structured light system
- a point spread function of at least one scene which is said subject of said initial image.

8. A method according to claim 1 wherein said at least one point spread function is a combination of at least two point spread functions, said at least two point spread functions comprising at least two of:
- a point spread function of at least one camera in said structured light system;
- a point spread function of at least one projector in said structured light system;
- a point spread function of at least one scene which is said subject of said initial image.

9. A method according to claim 1 wherein the or each pattern is a pattern belonging to least one of the following categories:
- direct codification
- neighborhood codification
- time-multiplexing codification.

10. A method according to claim 1 further including the step of using at least one regularization term for said deconvolving and segmenting, said at least one regularization term being based on probabilities derived from said characteristics of said structured light system.

11. A non-transitory computer readable storage medium having stored thereon at least one computer executable command for execution by a data processing system which, when executed by said data processing system, results in performance of the steps of a method for processing images from a structured light system for use with data processing systems, the method comprising:

obtaining at least one initial image from a structured light system, the or each of said at least one initial image being of a subject having projected on it at least one pattern by said structured light system;

determining characteristics of said structured light system;

iteratively segmenting and deconvolving said at least one initial image using said characteristics of said structured light system and at least one point spread function to result in at least resulting image, said resulting image being a more accurate image of said subject compared to said at least one image.

12. A method according to claim 1 wherein said segmenting comprises grouping image pixels into meaningful structures.

13. Computer readable media according to claim 11 wherein said segmenting comprises grouping image pixels into meaningful structures.

* * * * *